United States Patent [19]

Westhoff et al.

[11] Patent Number: 5,054,794

[45] Date of Patent: Oct. 8, 1991

[54] CLAMPING BAND FOR GASKETS AND THE LIKE AND EXPANSION MEANS THEREFOR

[75] Inventors: James Westhoff, Langhorne; James A. Kelly, Warrington, both of Pa.

[73] Assignee: A-LOK Products, Inc., Tullytown, Pa.

[21] Appl. No.: 322,302

[22] Filed: Mar. 13, 1989

[51] Int. Cl.[5] .......................... F16J 15/10; B23P 19/00; F16L 5/02; F16L 21/08

[52] U.S. Cl. .......................................... 277/1; 29/229; 29/235; 29/237; 29/455.1; 29/890.14; 267/1.5; 277/9; 277/9.5; 277/101; 277/138; 277/146; 277/207 A; 277/212 FB; 285/18; 285/39; 285/230; 285/236

[58] Field of Search ...................... 29/235, 157 R, 237, 29/225, 229, 222, 426.6, 453, 451, 523, 572.1, 235, 237, 261, 252, 269, 282; 277/1, 9, 9.5, 101, 138, 146, 207 A, 212 FB; 285/230, 236, 237; 24/272, 21, 279, 580–585, 20 R; 254/10.5, 104, 133 R, 134, 29 R, 29 A; 267/1.5

[56] References Cited

U.S. PATENT DOCUMENTS

| | | | |
|---|---|---|---|
| 413,301 | 10/1889 | Noxon | 24/580 |
| 488,017 | 12/1892 | Lang et al. | 24/585 |
| 520,018 | 5/1894 | Dowst | 24/580 |
| 1,204,028 | 11/1916 | Johnson | 29/222 |
| 1,714,053 | 5/1929 | Stokes | 24/580 X |
| 2,249,256 | 7/1941 | Phillips | 267/1.5 |
| 2,438,163 | 3/1948 | Haling | 267/1.5 |
| 2,660,271 | 11/1953 | Hupp . | |
| 3,101,743 | 8/1963 | Hoke . | |
| 3,200,464 | 8/1965 | Cousins | 24/581 |
| 3,614,139 | 10/1971 | Harrison . | |
| 3,814,409 | 8/1974 | Prasse | 267/1.5 |
| 3,958,313 | 5/1976 | Rossborough | 29/237 X |
| 4,019,750 | 4/1977 | Wiegard | 267/1.5 X |
| 4,478,437 | 10/1984 | Skinner | 277/1 X |
| 4,571,804 | 2/1986 | Grobler et al. | 29/235 |
| 4,711,455 | 12/1988 | Ditcher et al. | 277/9.5 |
| 4,744,132 | 5/1988 | Green et al. | 29/229 X |
| 4,746,127 | 5/1988 | Westhoff et al. | 277/1 |

FOREIGN PATENT DOCUMENTS

| | | | |
|---|---|---|---|
| 507352 | 10/1930 | Fed. Rep. of Germany . | |
| 1251076 | 12/1960 | France | 24/580 |
| 1628 | 1/1982 | Japan | 29/229 |

*Primary Examiner*—Allan N. Shoap
*Attorney, Agent, or Firm*—Louis Weinstein

[57] ABSTRACT

An expansion band having a spanning member whose free end is provided with a locking tab for cooperation with a locking surface having a plurality of selectable locking slots. A guide channel secured to the band cooperates with the band to define a guideway through which the spanning member extends thereby maintaining the spanning member and hence the free ends of the expansion band in alignment. During expansion of the expansion band the locking tab is free to snap out of each locking slot and into the next. Upon release of the expansion forces, however, the locking tab is prevented from snapping out of the locking slot in which it is presently inserted. A novel expansion unit comprised of a manual hydraulic pump operates a duck-bill type spreader which bears against associated bearing surfaces respectively provided on one end of the spanning member and one end of the guide channel to apply direct expansion forces to the expansion band. The locking tab and locking slots are shielded from the gasket expanded by the expansion band to protect the gasket from being scored and/or damaged.

20 Claims, 5 Drawing Sheets

CLAMPING BAND FOR GASKETS AND THE LIKE AND EXPANSION MEANS THEREFOR

FIELD OF THE INVENTION

The present invention relates to expansion bands and to a novel expansion band assembly for providing a water tight seal for gaskets within manhole bases and the like in which the band is uniquely expandable in a first direction while maintaining its locked position upon release of its expansion forces. Means are also provided for applying direct expansion forces to the expansion band in a simple and reliable manner.

BACKGROUND OF THE INVENTION

It is known in the art to utilize expansion bands for creating a water-tight seal between a gasket and a manhole opening in applications where the gasket is mounted in situ. For example, U.S. Pat. No. 4,387,900, assigned to the assignee of the present invention, discloses a gasket for use in an opening in manhole bases, which gasket is intended for in situ installation in manhole bases which have been precast in the factory or in which openings have been cored either at the factory or the job site. The gasket is comprised of an outer flange which is urged in an outward radial direction by an expansion band. The expansion band is clamped in the desired expanded position to place the gasket under compression and effect a fluid-tight seal between the gasket and the manhole base opening. The inner end of the gasket forms a water-tight seal about a pipe extending therethrough.

The clamping band described in U.S. Pat. No. 4,387,980 is plastic and is presized preparatory to delivery at the job site. A small insert portion, hingedly connected to one of the free ends of the clamping band, is moved into the gap between the free ends of the clamping band upon expansion thereof.

The disadvantages of such clamping bands reside in the fact that they are difficult to insert and that it is not possible to compensate for significant deviations in nominal diameter of the manhole opening. The latter problem is of the great concern in instances where openings are formed in the manhole by coring, the deviations in nominal diameter being caused, for example, due to the normal wearing of the coring equipment.

The expansion band of U.S. Pat. No. 4,387,900 has been improved by development of the expansion band described in U.S. Pat. No. 4,711,455 issued Dec. 8, 1987 and assigned to the assignee of the present invention. The hingedly mounted element of U.S. Pat. No. 4,387,900 is replaced by a plastic clamping band in which the free ends of the clamping band abut one another when the clamping band is expanded to the clamped position. This latter design also suffers from the same disadvantages of the clamping band in U.S. Pat. No. 4,387,900 in that the critical sizing problem remains unresolved.

Another solution to the problem has been developed as is disclosed in U.S. Pat. No. 4,746,127 in which a clamping band having an elongated slot at one end thereof and a cooperating projection slideably mounted within said slot enables the clamping band to be expanded, at which point an insert having a sawtooth configuration along one edge thereof is mounted within a transverse slot communicating with the first mentioned slot and cooperates with a similar saw tooth configuration along an associated engaging surface of said projection to lock the clamping band into the desired position. This structure has the disadvantage of requiring an additional, independant insert which must be inserted in place upon expansion of the band.

Still another improved method developed by the assignee of the present invention is described in copending application Ser. No. 174,076 filed Mar. 28, 1988, now U.S. Pat. No. 4,890,863 issued Jan. 2, 1990 and assigned to the assignee of the present invention. The clamping band of U.S. Pat. No. 4,890,863 is likewise provided with a separate, independant clamping member for maintaining the clamping band in the clamped position which either must be independantly tightened or must be inserted into the band upon expansion of the clamping band to the appropriate diameter.

BRIEF DESCRIPTION OF THE INVENTION

The present invention is characterized by comprising a metallic expansion band which is bent or otherwise manufactured to form a substantially annular-shaped band of channel-shaped cross section and having a discontinuity so as to form two free ends. A curved spanning member is joined to the clamping band a spaced circumferential distance from one of said free ends and extends across the gap between said free ends so as to overlap the remaining end of said clamping band. A guide channel is secured to said remaining end and cooperates with the clamping band to define a guideway through which the spanning member extends. A second channel-shaped locking member is joined to said clamping band at a spaced circumferential distance inwardly from said guide channel and is provided with a plurality of locking slots. The free end of the spanning member is provided with a locking tab which extends diagonally downwardly from the main body of the spanning member so as to snap into each successive locking slot as the expanding band undergoes expansion. The orientation of the locking tab permits the locking tab to snap out of each locking slot and into the next as the band undergoes expansion. Upon release of the expansion force, the tab is locked within one of the locking slots and is prohibited from snapping out of said slot.

A duck-bill type spreader is utilized to expand the expansion band and is provided with a pair of swingable arms or "duck bills" which apply direct expansion forces to a pair of bearing surfaces, one of which constitutes an upturned end of said spanning member and the other of which constitutes an edge of said guide channel.

The nature of the design of the expansion band is such that the duck-bill spreader is of one universal size to accomodate and expand expansion bands of varying diameter due to the fact that, regardless of the final diameter of any expansion band, the circumferential range of distances between the aforementioned bearing surfaces does not change and accomodates the universal duck-bill spreader, thus permitting the use of a single size universal duck bill spreader design.

The nature of the expansion band is such that it is also permissible to nondestructively remove and reuse the expansion band.

OBJECT OF THE INVENTION AND BRIEF DESCRIPTION OF THE FIGURES

It is therefore one object of the present invention to provide a novel expansion band capable of accomodating the mounting of gaskets in openings whose diameters may differ substantially from a nominal or expected diameter and which is capable of automatically locking in the desired expanded postion.

Still another object of the present invention is to provide a novel expansion band for use in gasket assemblies and the like wherein the expansion band is provided with a spanning member having a locking tab cooperating with a plurality of locking slots and being arranged in such a manner as to move into and out of each locking slot as the expansion band is expanded while remaining locked in a locking slot when the expansion force is released.

Still another object of the present invention is to provide novel spreading means for expanding an expansion band.

Still another object of the present invention is to provide a novel expansion band for use with gasket assemblies and the like and having bearing surfaces for the direct application of expansion forces thereto to facilitate and expedite the insertion and clamping of the expansion band.

Still another object of the present invention it to provide a novel expansion band for use with gasket assemblies and the like and being of a design which shields the gasket assembly from edges or openings of the expansion band which might otherwise cause damage to the gasket if not so shielded.

The above as well as other objects of the present invention will become apparent when reading the accompanying description and drawing in which:

FIG. 1*a* is a perspective view, partially sectionalized, of a gasket which may employ the novel expansion band of the present invention.

FIG. 1*b* shows a sectional view of the expansion band and gasket of FIG. 1*a* in the fully assembled postion.

FIG. 2 shows an exploded perspective view of an expansion band assembly designed in accordance with the principles of the present invention.

Figure 4:
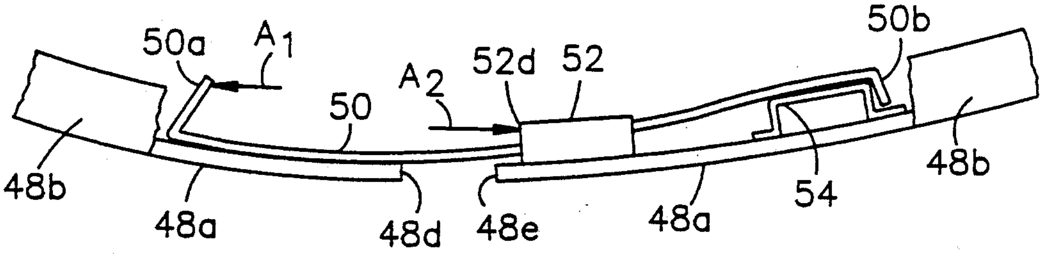
FIG. 4 shows an assembled end view of the expansion band of FIG. 2.
Figure 4A:
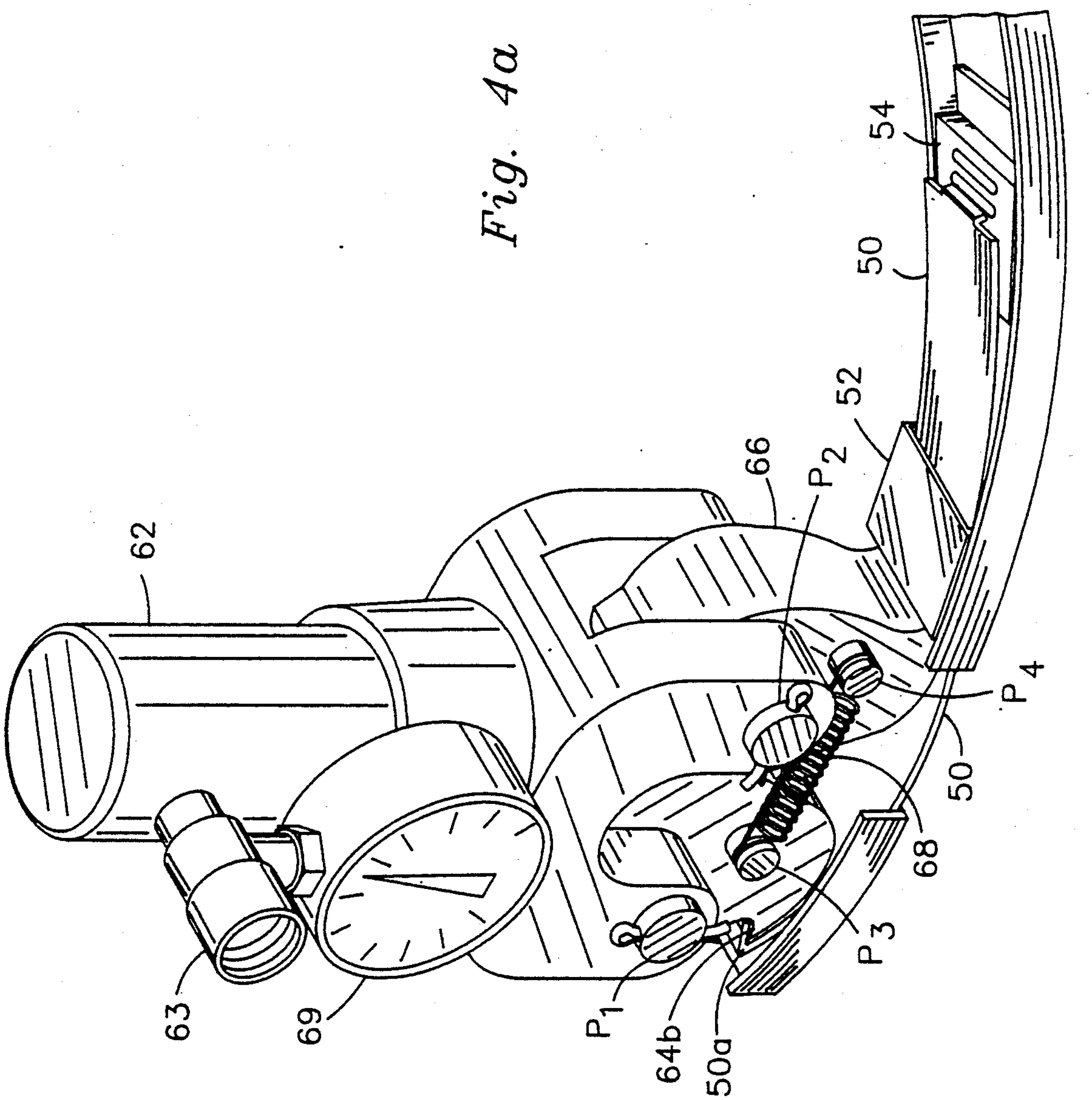

FIG. 4*a* shows a perspective view of an expansion unit mounted for expansion of an expansion band.

Figure 5A:
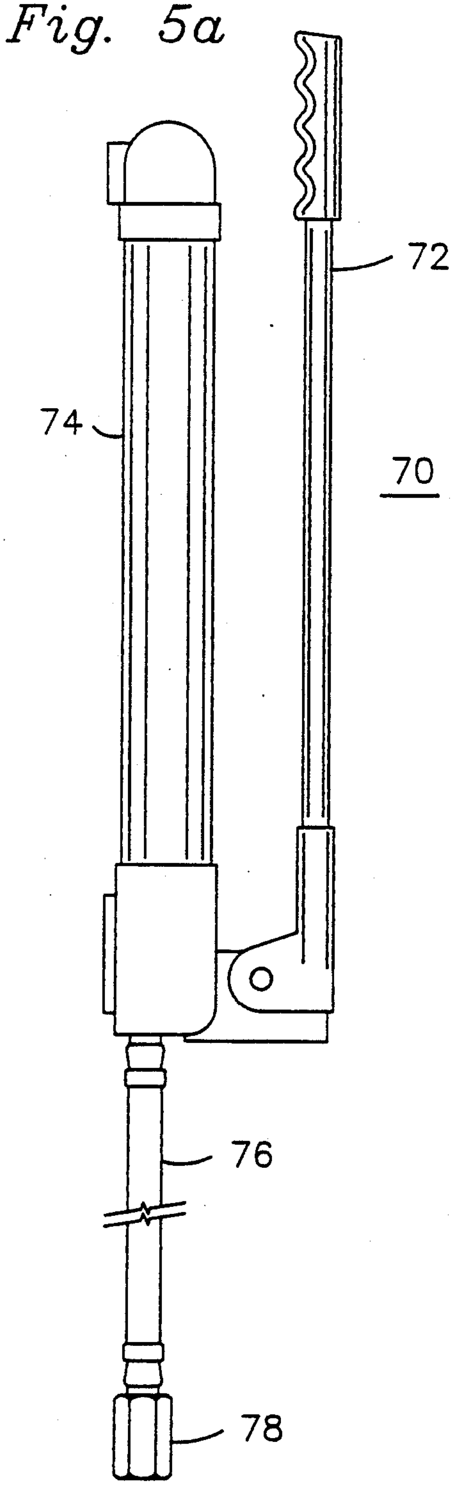
Figure 5B:
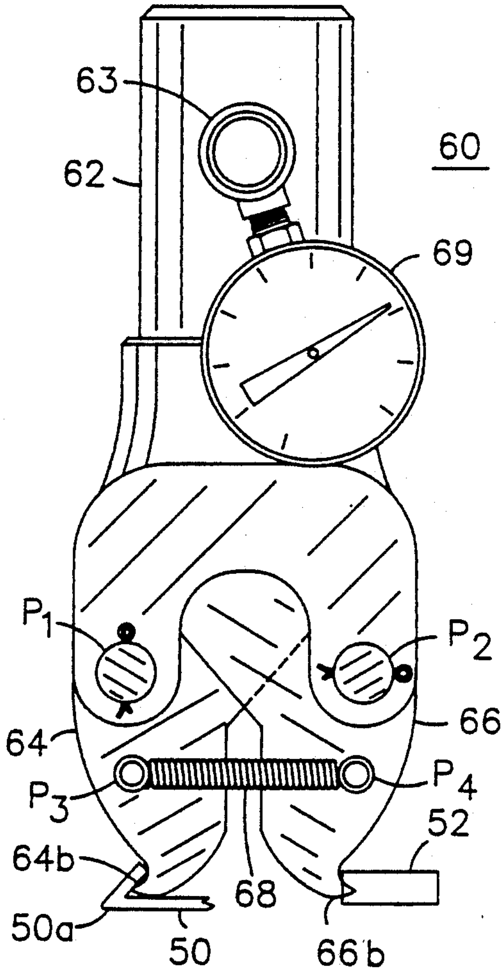

FIGS. 5*a* and 5*b* show the assemblies which, when combined, comprise the hydraulic expansion jack unit of the present invention.

Figure 6:
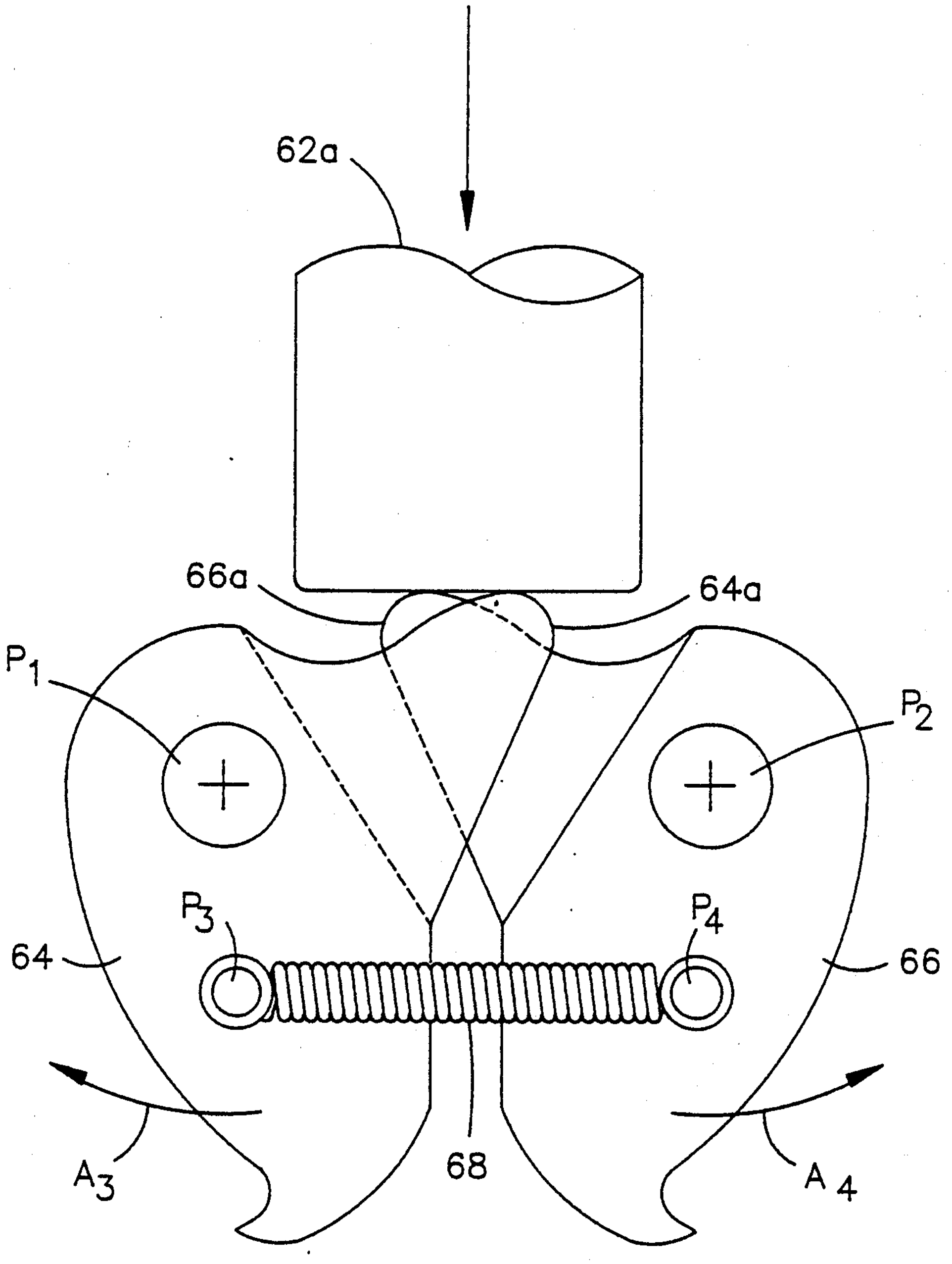

FIG. 6 shows portions of the expansion band spreader unit of FIG. 5 in greater detail.

DETAILED DESCRIPTION OF THE INVENTION AND PREFERRED EMBODIMENT THEREOF

Figure 1A:
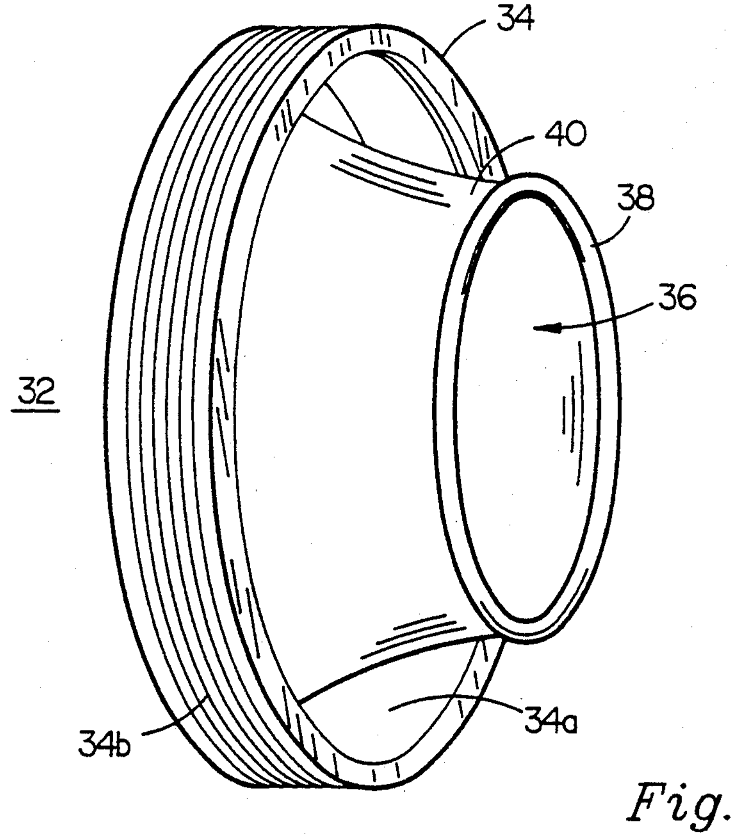
Figure 1B:
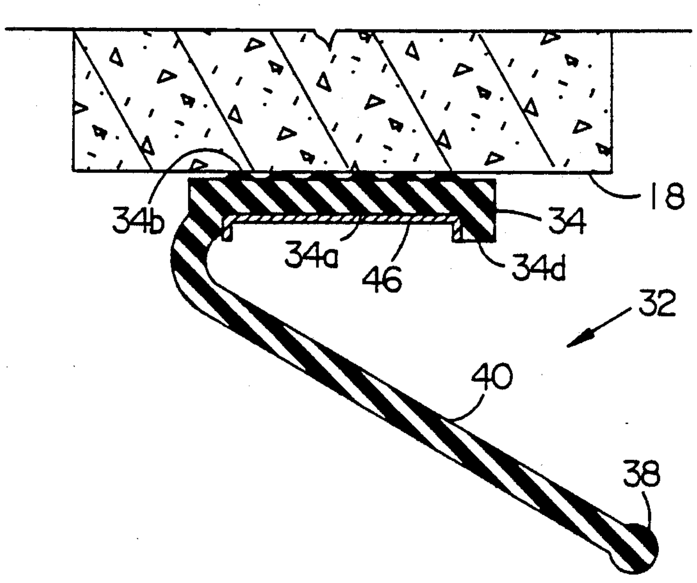

FIGS. 1*a* and 1*b* respectively show a perspective view partially sectionalized, and a sectional view of a gasket 32 which may be utilized with the expansion ring of the present invention. Gasket 32 is preferably formed of a suitable flexible, resilient, compressible rubber or rubberlike material and is provided with a large diameter flange 34 coupled to an enlarged bead 38 of reduced diameter by means of an integral conical section 40. Flange 34 is provided with V-shaped grooves 34*b* about its outer periphery to provide an intimate, water-tight seal with the surface of an opening 18 as shown in FIG. 1*b*, which opening may be provided within a manhole base, for example. A shallow annular recess 34*a* provided along the interior periphery of large diameter flange 34 is adapted to receive the expansion ring 46 which is shown in sectional fashion in FIG. 1*b* as having a channel-shaped configuration. The expansion ring expands radially outwardly as will be more fully described to provide a water-tight seal between large diameter flange 34 and opening 18. A pipe extends into gasket 32 and is embraced by enlarged bead 38 as is well known and shown for example, in U.S. Pat. No. 4,711,455 issued Dec. 8, 1987 and assigned to the assignee of the present invention. In addition, a metallic garter-type clamp may be placed about the outer periphery of the conical-shaped portion 40 and preferably in close proximity to bead 38 to further enhance the water-tight seal between gasket 32 and the pipe extending therethrough.

FIG. 2 shows an exploded view of the expansion ring 46 of the present invention which is comprised of an annular-shaped channel 48 having a central portion 48*a* and integral upright sides 48*b*, 48*c*. The annular band terminates to form free ends 48*d* and 48*e*. Curved spanning member 50 is provided with an upwardly and inwardly extending left-hand end 50*a* and a diagonally aligned locking tongue 50*b* provided at its right-hand end and extending downwardly and to the right.

Figure 3:
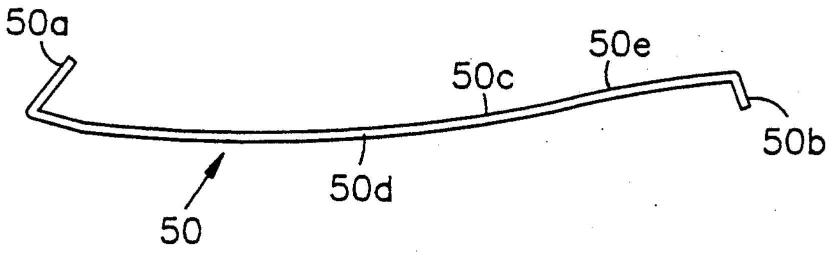
FIG. 3 shows an end view of the spanning member which forms part of the expansion band of FIG. 2.

FIG. 3 shows a side view of spanning member 50. Member 50 is generally S-shaped and at 50*c* curves generally upwardly and away from main portion 50*d* and at approximately 50*e* curves generally downwardly.

The left-hand end of spanning member 50 is positioned within the interior of band 48 so that it is embraced by sides 48*b*, 48*c* and its bottom surface engages the top surface of central portion 48*a*. These mating surfaces are then securely joined together preferably by welding. The spanning member 50 is aligned relative to the left-hand portion of band 48 as shown in FIG. 2 so as to extend over the gap space between free ends 48*d* and 48*e* and so as to overlap a predetermined portion of the band extending circumferentially to the right of free end 48*e*.

A channel-shaped guide member 52 is positioned within the interior of band 48 a spaced circumferential distance inward and to the right of free end 48*e*, forming an elongated rectangular-shaped guide region through which spanning member 50 extends. Guide member 50 is firmly secured to band 48 preferably by welding.

A locking member 54 is arranged within the interior of band 48 a spaced circumferential distance to the right of free end 48*e* and a lesser spaced circumferential distance to the right of guide member 52. Member 54 is provided with a locking surface 54*a* having a plurality of elongated locking slots 54*b*. Locking surface 54*a* is maintained a spaced distance above the interior surface of central portion 48*a* of band 48 by means of downwardly depending integral sides 54*c*, 54*d* which terminate in integral mounting flanges 54*e*, 54*f* respectively which extend away from the locking surface 54*a* and substantially vertically aligned portions 54*c*, 54*d*. Mounting flanges 54*e*, 54*f* engage the interior surface of the central portion 48*a* of band 48 and are preferably welded thereto.

The manner in which expansion ring 46 functions is as follows:

When fully assembled, the spanning member extends across the gap between free ends 48*d*, 48*e* and through the guide region defined by band 48 and guide channel 52. The right-hand portion of spanning member 50 extends over locking member 54 and flange (i.e. locking tongue) 50*b* extends toward the surface 48*a* of band 48 and to the right of the right-hand end of locking member 54. Expansion ring 46 is placed in the annular recess 34*a* of gasket 32. Expansion forces are then applied to flange 50*a* and to the left-hand edge 52*d* of guide channel 52 in the directions shown by arrows A1 and A2 and preferably by a hydraulic expansion jack unit to be more fully described (see FIG. 4*a*) causing band 48 to expand in the radial direction. Free ends 48*d*, 48*e* move apart and locking tongue 50*b* begins to slide along the exterior locking surface 54*a* of locking member 54 until the free end of locking tongue 50*b* is aligned with the right-hand-most locking slot 54*b'*, whereupon the locking tongue 50*b* snaps into this locking slot. So long as the expansion forces are maintained, the free ends 48*d*, 48*e* of band 48 continue to move further apart and the locking tongue 50*b* moves out of the first locking slot and will continue to snap into each successive locking slot arranged to the left of the right-hand-most locking slot 54*b'*.

If the present expansion force is not increased but is maintained constant, the locking tongue 50*b* will remain in the last locking slot which it has entered. If the expansion forces are removed (preferably in a gradual manner), the gasket 32 which has been compressed by the expansion of the expansion ring 46 will urge ring 46 to reduce its diameter. However, the diagonal orientation of locking tongue 50*b* within the last locking slot which it has entered prevents the locking tongue from being removed from the last-mentioned locking slot thereby retaining the expansion ring in the locked position.

The locking tongue 50*b* is prevented from engaging the gasket flange 34 due to the positioning of the locking tongue 50*b* and cooperating locking member 54 as well as the interior surface of band 48. Guide channel 52 serves to urge spanning member 50 downwardly as the upwardly curved portion of the spanning member mover along guide channel 52 and further prevents the spanning member 50 from experiencing any lateral movement thus positively maintaining proper alignment of the free ends 48*d*, 48*e* of the expansion ring as the ring is either expanded or reduced in diameter.

FIG. 4*a* shows an expansion unit mounted for expanding an expansion band and FIGS. 5*a* and 5*b*, taken together, show an elevational view of the hydraulic expansion jack unit 60 which is comprised of a cylinder portion 62. Coupling 63 is adapted to receive a cooperating coupling 78 of a hydraulic power unit 70 comprising a manually operable handle portion 72 with a cylinder portion 74 for urging hydraulic fluid through flexible conduit 76. When coupling 63 is joined with coupling 78, hydraulic fluid under pressure is introduced into cylinder 62 to cause the downward movement of a piston 62*a* shown in FIG. 6 against the bearing surfaces 64*a*, 66*a* of a pair of jaws 64, 66, which are pivotally mounted by pins P1 and P2 to the hydraulic expansion jack unit, to urge the bearing surfaces downwardly under the downward force exerted by piston 62*a* thereby causing the jaws 64, 66 to move respectively clockwise and counter clockwise as shown by arrows A3 and A4 in FIG. 6. Helical spring 68 is coupled to jaws 64 and 66 by pins P3 and P4 to cause the jaws to move toward one another upon the release of the hydraulic pressure.

A pressure gauge 69 is coupled to cylinder 62 in the region of coupling 63 for the purpose of obtaining a reading of the hydraulic pressure.

As shown in FIG. 5, the free ends 64*b*, 66*b* of jaws 64, 66 respectively bear against bearing flange 50*a* and bearing edge 52*a* of spanning member 50 and guide channel 52' for expanding the expansion ring. The expansion jack unit 60, although extremely powerful, is sufficiently small in size as to be easily positioned within the annular region defined by the expansion ring, thus greatly simplifying its handling, positioning and use.

The expansion jack unit 60 is simply positioned within the confines of the expansion ring after the expansion ring has been placed within the recess 34*a* provided within the large diameter flange of gasket 32. The coupling 78 is joined to the coupling 63 and the hydraulic power unit 70 is manually pumped to apply hydraulic pressure to cylinder 62. The desired expansion is preferably determined by taking the appropriate reading from the pressure gauge 69. In the preferred embodiment, 70 psi is the nominal pressure on ring 46 in order to obtain an optimum water-tight seal with a tolerance of ±5%. Upon development of the appropriate pressure, the pumping action is halted and the hydraulic pressure is slowly released from the cylinder unit 62 whereupon the expansion ring is maintained in the desired locking position due to the unique arrangement of and cooperation between one of the locking slots 54*a* and the locking tongue 50*b*.

The expansion rings of the present invention may be of a variety of different circumferential dimensions. However, the expansion jack unit 60 is a universal unit and may be used to expand expansion rings regardless of their maximum amount of outer diameter since the positioning of the spanning member 50, guide channel 52 and the bearing flange 50*a* of the expanding member 50 relative to the free ends 48*d*, 48*e* of the expansion ring 48 remains constant regardless of the difference in annular periphery of band 48.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described. For example, the expansion jack unit may be used to expand other expansion rings and the expansion ring may be expanded using other techniques. Also, the expansion band may be used with gaskets other than that described herein.

What is claimed is:

1. An expansion ring assembly for urging an annular resilient gasket into intimate contact with an opening in a surface to provide a water-tight seal comprising:

an annular-shaped band having a concave interior surface and first and second free ends movable relative to one another to either expand or reduce the diameter of said band;

said band having a continuous outer convex surface engaging said gasket;

a generally arcuate-shaped spanning member located along the concave interior surface of said band, one end of the spanning member being secured to the concave interior surface of said band at a position along said band and a spaced circumferential distance inward from one of said first and second free ends, the remaining end of said spanning member extending toward and beyond the remaining one of said first and second free ends;

said remaining end of said spanning member having a locking tongue extending toward the concave interior surface of said band;

said band including locking means arranged along said concave interior surface and having a plurality of spaced-apart slots selectively adapted to receive said tongue to adjustably lock said band at a predetermined diameter;

said locking tongue extending downwardly toward said locking means at an angle such that said tongue is released from a slot when said band is expanded and is locked in a slot when said band is urged in a direction to reduce the diameter of said band;

guiding means joined to said band and cooperating with said band to form a hollow guide region for slidably receiving and guiding said spanning member along the concave interior surface of said band and limiting lateral movement in mutually perpendicular directions of the remaining end of the spanning member relative to said band; and said resilient gasket, when compressed by said band, applying a force to said band to urge said band in a direction to reduce the diameter of said band, thereby preventing removal of the locking tongue from the slot in which it is presently inserted.

2. The assembly of claim 1 wherein said spanning member is provided with a first bearing surface;

said guiding means including a second bearing surface spaced a circumferential distance from said first bearing surface;

said first and second bearing surfaces being adapted for engagement with an expansion device for expanding the band against the resilient gasket so that the expanding force is directly applied to the band without slippage.

3. The assembly of claim 1 wherein said spanning member is joined to said band by at least one weldment.

4. The assembly of claim 1 wherein the end of said spanning member opposite said locking tongue is provided with an integral bent portion, said first bearing surface being the free end of said bent portion and being aligned substantially transverse to the circumferential direction of said band.

5. The assembly of claim 1 wherein said spanning member is generally flexible and said guiding means limits the movement of the free end of said spanning member radially inwardly and away from the concave interior surface of said band and normally urges said tongue radially outwardly and toward said band concave interior surface to facilitate the locking action between said locking tongue and one of said slots.

6. The assembly of claim 1 wherein said locking tongue is comprised of a projection integral with one free end of said spanning member and bent so that the plane of said projection is transverse to the circumferential direction of said band and extends toward said slots.

7. The assembly of claim 1 wherein said band and said spanning member are formed of a suitable metallic material.

8. The assembly of claim 7 wherein said metallic material is stainless steel.

9. The assembly of claim 1 wherein said spanning member is an elongated member whose width is less than the width of said band;

an intermediate portion of said spanning member having a generally S-shaped curvature so that the free end thereof having the locking tongue is spaced radially inwardly from the concave inner surface of said band to facilitate insertion of said tongue into said slots.

10. An expansion ring assembly for urging an annular resilient gasket into intimate contact with an opening in a surface to provide a water-tight seal comprising:

an annular-shaped band having a concave interior surface and first and second free ends movable relative to one another to either expand or reduce the diameter of said band;

a generally arcuate-shaped spanning member located along the concave interior surface of said band, one end of the spanning member being secured to the concave interior surface of said band at a position along said band and a spaced circumferential distance inward from one of said first and second free ends, the remaining end of said spanning member extending toward and beyond the remaining one of said first and second free ends;

said remaining end of said spanning member having a locking tongue;

said band including locking means having a plurality of spaced-apart slots for selectively receiving said locking tongue to adjustably lock said band at a predetermined diameter;

guide means joined to said band and cooperating with said band to form a guide region for slidably receiving and guiding said spanning member and limiting lateral movement of the remaining end of the spanning member relative to said band; and said guide means comprising a channel-shaped member having a central portion and a pair of integral depending arms having ends extending away from said central portion and toward said band, the ends of said arms engaging said band, said guide means central portion having an edge serving as a second bearing surface and being arranged substantially transverse to the circumferential direction of said band.

11. An expansion ring assembly for urging an annular resilient gasket into intimate contact with an opening in a surface to provide a water-tight seal comprising:

an annular-shaped band having a concave interior surface and first and second free ends movable relative to one another to either expand or reduce the diameter of said band;

a generally arcuate-shaped spanning member located along the concave interior surface of said band, one end of the spanning member being secured to the concave interior surface of said band at a position along said band and a spaced circumferential distance inward from one of said first and second free ends, the remaining end of said spanning member extending toward and beyond the remaining one of said first and second free ends;

said remaining end of said spanning member having a locking tongue extending toward the concave interior surface of said band;

said band including locking means arranged along said concave interior surface and having a plurality of spaced-apart slots for selectively receiving said locking tongue to adjustably lock said band at a predetermined diameter;

guiding means joined to said band and cooperating with said band to form a hollow guide region for slidably receiving and guiding said spanning member and limiting lateral movement of the remaining end of the spanning member relative to said band; and wherein said locking means spaced-apart slots are provided in a slotted member which is spaced radially inwardly from the concave interior surface of said band to provide sufficient clearance to permit said tongue to extend fully into each of said slots, the concave interior surface of said band preventing the locking tongue from engaging the gasket.

12. An expansion ring assembly for urging an annular resilient gasket into intimate contact with an opening in a surface to provide a water-tight seal comprising:

an annular-shaped band having a concave interior surface and first and second free ends movable relative to one another to either expand or reduce the diameter of said band;

a generally arcuate-shaped spanning member located along the concave interior surface of said band, one end of the spanning member being secured to the concave interior surface of said band at a position along said band and a spaced circumferential distance inward from one of said first and second free ends, the remaining end of said spanning member extending toward and beyond the remaining one of said first and second free ends;

said remaining end of said spanning member having a locking tongue extending toward said concave interior surface;

said band including locking means having a plurality of spaced-apart slots for selectively receiving said tongue to adjustably lock said band at a predetermined diameter;

guiding means joined to said band and cooperating with said band to form a hollow guide region for slidably receiving and guiding said spanning member and limiting lateral movement of the remaining end of the spanning member relative to said band; and said annular-shaped band having a channel-shaped cross-section comprising a central portion and a pair of integral arms extending radially inwardly and away from said gasket.

13. An expansion band assembly and a cooperating expansion assembly for expanding said expansion band assembly, said expansion band assembly comprising an annular-shaped band having first and second free ends;

first and second bearing surfaces arranged at spaced locations along said band, each location being intermediate said first and second free ends;

said expansion assembly comprising a cylinder;

a bifurcated member mounted to said cylinder;

a pair of spreader arms pivotally mounted to said bifurcated member;

said cylinder having a piston means;

each of said spreader arms having a piston engaging surface;

said piston engaging surfaces arranged adjacent to one another;

said piston means having a driving end engaging both of said piston engaging surfaces for simultaneously moving said spreader arms;

said spreader arms each having a free end, said free ends extending in opposing directions;

said free ends each having a driving surface for engaging one of the bearing surfaces provided along said expansion band for radially expanding the annular-shaped band when a driving force is applied to said cylinder for moving said piston means in a first predetermined direction.

14. The apparatus of claim 13 wherein the free ends of said spreader arms are curved to provide concave surface portions which terminate at the free ends of spreader arms, said concave surface portions facilitating the engagement of an associated bearing surface therewith and hence to facilitate the expansion of said annular-shaped band.

15. The apparatus of claim 13 wherein said expansion assembly further comprises hand-operated hydraulic means for applying hydraulic pressure to said cylinder.

16. The apparatus of claim 13 wherein the circumferential distance between said bearing surfaces lies within a predetermined range to permit use of an expansion assembly of a predetermined size regardless of differences in the circumference of the annular-shaped band, enabling the expansion assembly to accomodate gaskets and bands of different diameters.

17. The apparatus of claim 16 wherein one of said bearing surfaces is located a predetermined circumferential distance inward from one of said first and second free ends of said band and the other one of said bearing surfaces is located a predetermined circumferential distance inward from the other one of said first and second free ends of said band.

18. A method for providing a water-tight connection between a gasket and an opening provided in a wall, said gasket being an annular-shaped resilient member having one end of larger diameter for insertion into said wall opening and a second end of smaller diameter for receiving and tightly embracing a pipe, said method comprising the steps of:

inserting said one end of said gasket end into said opening;

placing an expansion band against the interior surface of that portion of said annular gasket arranged within said opening, said expansion band being an annular-shaped discontinuous member having a continuous inner concave surface and first and second free ends movable relative to one another and having bearing surfaces each being arranged along said inner concave surface at spaced circumferential distances inwardly from an associated one of said free ends;

applying an expansion force directly against each of said bearing surfaces for expanding said expansion band to thereby compress the portion of said gasket arranged between said expansion band and said opening and to urge said gasket one end arranged in said opening into intimate contact with the surface of said opening whereby said gasket one end is at least partially compressed;

said expansion forces being applied in opposing substantially circumferential directions;

providing a locking tongue adjacent one free end of said expansion band and overlapping a concave portion of the expansion band adjacent to the remaining free end of said expansion band, said locking tongue being diagonally aligned relative to said expansion band and extending towards said expansion band concave portion;

providing a member having a plurality of slots arranged in the region of and spaced inwardly from the inner concave surface of said expansion band which said locking tongue overlies;

and urging said locking tongue into one of said slots when said expansion band has been expanded to a predetermined size to thereby lock the expansion band in the desired expanded position, the gasket end engaged by the expansion band cooperating with the expansion band to maintain the expansion band in the expanded and locked position.

19. The method of claim 18 further comprising the steps of removing the expansion forces from said bearing surfaces whereby the expansion band remains locked in its expanded position with the locking tongue extending into one of said slots, said expansion band at least slightly compressing the portion of the gasket one end between said opening and said expansion band.

20. The method of claim 18 further comprising the step of maintaining the expansion forces to cause said locking tongue to snap out of at least one of the slots and snap into the next adjacent slot.

* * * * *

UNITED STATES PATENT AND TRADEMARK OFFICE

CERTIFICATE OF CORRECTION

PATENT NO. : 5,054,794

DATED : October 8, 1991

INVENTOR(S) : Westhoff et al.

It is certified that error appears in the above-identified patent and that said Letters Patent is hereby corrected as shown below:

Column 1, line 43, delete "the"

Column 2, line 54, change "accomodate" to --accommodate--

Column 2, line 58, change "accomodates" to --accommodates--

Column 2, line 68-Column 3, line 1, change "accomodating" to --accommodating--

Column 3, line 4, change "postion" to --position--

Column 3, line 36, change "postion" to --position--

Column 5, line 39, change "mover" to --moves--

Column 6, line 4, change "52'" to --52,--

Signed and Sealed this

Twenty-third Day of March, 1993

*Attest:*

STEPHEN G. KUNIN

*Attesting Officer*

*Acting Commissioner of Patents and Trademarks*